United States Patent Office 3,253,057
Patented May 24, 1966

3,253,057
TREATMENT OF FLUORINATED POLYMERS AND PRODUCTS OBTAINED THEREBY
Yvan Landler, 12 Blvd. Desgranges, Sceaux, Seine, France, and Pierre H. Lebel, 290A Ave. Napoleon Bonaparte, Rueil-Malmaison, Seine-et-Oise, France
No Drawing. Filed May 4, 1962, Ser. No. 192,309
Claims priority, application France, May 6, 1961, 86,196
12 Claims. (Cl. 260—877)

This application is a continuation-in-part of our copending application Serial No. 697,773, filed November 21, 1957.

This invention relates to the treatment of fluorinated polymers, viz polymers formed from polymerizable fluorine-containing monomers, such as fluorine-containing hydrocarbon polymers commonly known as fluorocarbon resins, and to the products resulting from such treatment.

Fluorinated polymers are known to be highly resistant to chemical reaction and to relatively high temperatures, even during prolonged exposure. This significant chemical inertness, which is one of the characteristics of fluorinated polymers, is highly advantageous for certain uses. However, for other uses, it is a serious drawback, and this is particularly the case when it is desired to cause a fluorinated polymer to adhere to another substance.

A technique known in the art as "grafting" involves the chemical modification of polymers so that the surfaces treated will be more adherent to the surfaces of other materials. A grafting technique which involves ozonization of the polymer to be grafted, and the application of this technique to fluorinated polymers, has been described in our copending application Serial No. 697,773, filed November 21, 1957.

The ozonization of fluorinated polymers is thus possible, but it is more difficult than in the case of other polymers and it generally requires more prolonged periods of ozonization. At the same time, it does not always lead to the desired homogenity of reaction. This lack of homogenity is encountered not only in the ozonization operation itself but is also evident after grafting.

It is an object of the present invention to provide a method of treating fluorinated polymers which has the effect of rendering them more chemically reactive.

It is a further object of the invention to provide a process of the character indicated which makes is possible to obtain more rapid and homogeneous grafting, such as by the ozonization technique described in our above-mentioned copending application.

In accordance with the invention, the fluorinated polymer is heated in the presence of a carbon-containing compound which has at least one ethylenically-unsaturated group and which also contains an unsaturated ring containing 5 to 6 members, the ring being either homocyclic or heterocyclic.

When the fluorinated polymer is heated in the presence of a compound of the character described, which will hereinafter be referred to as a "treating compound," there is observed a material increase in the mass of the polymer, showing that the fluorinated polymer has absorbed a certain quantity of the treating compound with which it is treated. However, the adsorbed fraction cannot be extracted from the polymer by treatment with solvents for the treating compound.

Treatment of the fluorinated polymer with the treating compound is, in accordance with the invention, carried out at temperatures between 80 and 250° C., and preferably at temperatures between 140 and 200° C. The treatment may be carried out with the treating compound in liquid form or in vapor form, although use of the compound in vapor form is preferred and particularly desirable to insure the maximum realization of the results which can be achieved in accordance with the invention. The reaction is carried out with the treating compound providing a surrounding environment for the polymer, viz with the polymer immersed in a body of the treating compound, or with the polymer continuously exposed to an atmosphere of vapors of the treating compound. The period of treatment can vary over a wide range but is suitably at least 30 minutes, and is geneally about 180 minutes, although longer periods of time can be employed if desired. The amount of treating compound can vary widely, it only being necessary to provide sufficient treating compound to permit reaction throughout the period of treatment. The amount of treating compound may vary especially in accordance with the specific surface of the polymer to be treated i.e. the surface of a given weight of this polymer and it may also vary with the volume of the vessel in which the treatment has to be achieved as compared to the volume of the polymer to be treated.

Thus the amount of treating compound used for the treatment and which will be only partially fixed will be at least 0.1% of the weight of the polymer to be treated and, commonly, will not exceed 100% of this same weight.

By such treatment there is obtained a fluorinated polymer which has a chemical reactivity much greater than that of the fluorinated polymer initially subjected to treatment and the fluorinated polymer which has been treated in accordance with the invention can be ozonized and then grafted much more rapidly and in a much more homogeneous manner than is possible with the untreated polymer. The grafted polymer which results from the ozonization and grafting of a fluorinated polymer treated with a treating agent in accordance with the invention, has greatly improved properties of adherence to other materials, of dyeability, and of ink-receptivity in comparison with the fluorinated polymers initially subjected to treatment and in comparison with fluorinated polymers which have been ozonized and grafted but without previous treatment with a treating compound following the procedure of this invention.

The term "polymer" is used in this specification and in the claims in a generic sense in accordance with the definition contained in chapter 1, more particularly page 16 et seq. of "Fundamental Principles of Polymerization" by G. F. D'Alelio and includes compounds formed from one or more kinds of monomers.

According to this definition "oligomers" as defined on page 20 of the D'Alelio book are without the scope of the invention. The invention is particularly applicable to macromolecules having a molecular weight greater than 2,000.

Thus, the term polymer includes not only homopolymers, copolymers and interpolymers as these terms are known in the art, but it also includes a mixture of two or more homopolymers or of two or more copolymers, or of at least one homopolymer with at least one copolymer.

The term "fluorinated polymer" is also used in this specification and in the claims in a generic sense to cover all polymers, copolymers and interpolymers, as defined above of polymerizable fluorine-containing monomers, including fluorinated olefins, fluorinated polyolefins, and fluorinated vinyl compounds. The polymer is not limited to hydrocarbon polymers containing only fluorine as the substituent but also comprises fluorinated polymers having other substituents, e.g. other halogen atoms, such as chlorine. The polymer is also not limited to fluorinated hydrocarbons but includes polymers containing carbonyl and other groups. Examples of fluorinated polymers which are particularly suitable for use in the process of this invention and which give products of particularly desirable properties and chemical reactivity are polymers and copolymers of tetrafluoroethylene, trifluoromonochloroethylene, vinylidene fluoride, hexafluoropropylene, fluorobutadiene, fluoroacrylic acids, fluoromethacrylic acids, esters of fluoroacrylic and fluoromethacrylic acids, such as methyl fluoroacrylic acid and ethyl fluoromethacrylic acid, fluorinated styrenes, such as orthomonofluorostyrene, metamonofluorostyrene, and paramonofluorostyrene, fluorinated alkyl-substituted styrenes, such as trifluoroalphamethylstyrene, and the like, and copolymers formed by copolymerizing two or more of these monomers, such as copolymers of tetrafluoroethylene and hexafluoropropylene.

The treating compound may be any polymerizable compound characterized by having at least one ethylenically-unsaturated group, e.g. a vinyl group, and a non-saturated homocyclic or heterocyclic ring of 5 to 6 members. The ethylenically-unsaturated group, e.g. the vinyl group, may be attached directly to the ring or it may be attached to an intervening group or atom, such as a methylene group, an oxygen atom, or a nitrogen atom. In general, the treating compound suitably has the formula $A-(Z)_n$, wherein A represents the homocyclic or heterocyclic ring, and wherein Z is

or

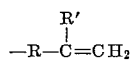

In the foregoing formula, R represents the intervening group between the ring A and the ethylenically-unsaturated group and is more commonly —O—, —NH—, or —CH$_2$—, R' is hydrogen or a lower alkyl group, i.e. an alkyl group containing up to about 5 carbon atoms, and n is an integer which is 1 or 2. In general, any of the hydrogen atoms in the above formulas may be replaced by a lower alkyl group. Furthermore, the ring member A may contain other substituents such as lower alkyl groups, halogen groups, e.g. chloro groups, amino groups, lower alkoxy groups, or the like. The ring represented by A may be a benzene ring, a pyridine ring, a thiophene ring, or the like.

Typical examples of suitable treating compounds for use in the process of this invention are styrene, alphamethyl styrene, p-methoxystyrene, a monochlorostyrene, such as p-chlorostyrene, a polychlorostyrene, such as 3,4-dichlorostyrene, a vinyl toluene, such as p-vinyl toluene, alpha-vinyl toluene, alpha-vinyl thiophene, allyl phenyl ether, divinylbenzene, N-allyl aniline, allylbenzene, 2-vinyl pyridine, and the like.

After the treatment with the treating compound, there may appear on the surface of the treated polymer some small amounts of treating agent which have not been fixed on the treated polymer.

In order to remove this unreacted treating agent, it is suitable to wash the treated polymer with a solvent of the treating compound and the treated polymer is then dried.

It has been found that the treatment by the above-described process results in the incorporation in the treated fluorinated polymer of a relatively small but significant amount of the treating compound. This amount will be considerably different according to the thickness of the sample of fluorinated polymer treated.

In general, the treatment is limited to the surface of the polymeric object which has to be treated.

If the polymeric object is very thick the quantity fixed will be very low, and if on the contrary, the polymeric object is very thin, the quantity fixed will be greater.

So, it seems preferable in many cases to define the quantity of treating compound fixed not with respect to the weight of the polymer treated but rather with respect to that of the surface.

As expressed with respect to the weight of the treated polymer, the amount of treating compound will be mainly included between 0.05% and 5% and as expressed with respect to the surface of the treated polymer, the amount of treated compound will be mainly comprised between $5.10^{-7}$ gram moles per square centimeter and $1.5 \cdot 10^{-4}$ gram moles per square centimeter.

The incorporated treated compound is found to be in polymeric form.

When the treated fluorinated polymer is subjected to ozonization and subsequent grafting, the procedure described in our above-mentioned copending application, Serial No. 697,773, are suitably utilized. Thus, the treated polymer is submitted to the action of ozone to form labile functions, chemically bound on to the polymer and capable of inducing the polymerization of a monomer by a so-called free radical mechanism, and then subjecting the thus-obtained ozonized polymer which thus acts as grafting catalyst in the presence of a monomer under conditions which decompose the labile function introduced on the polymer, to produce reactive polymeric units which inter-react with the monomer to produce the grafted product.

Thus, the ozone treatment of the polymer to be grafted is effected by exposing the polymer in a suitable vessel to a stream of ozone or a gaseous stream containing ozone, e.g., air or oxygen containing ozone. When an air or oxygen stream is employed, the content of ozone is advantageously 0.1 to 8%, preferably 0.5 to 3%, by weight. Ozonization is carried out by subjecting the polymer to the action of ozone at the rate of 0.5 to 200 grams, preferably 1 to 100 grams, per hour (calculated as 100% ozone) per kg. of polymer during 0.5 to 2000 minutes, preferably 1 to 600 minutes. The temperature of the polymer during the ozonization steps must be maintained between —30° to 130° C., preferably between 0° to 100° C. The decomposition of the labile function formed on the ozonized polymer being subjected to grafting and forming the backbone polymer is advantageously effected by the action of heat, e.g., by exposing the polymer to temperatures of 20 to 200° C., preferably 60 to 130° C., this action of heat may be minimized by the action of reducing agents of the type used in the so-called Redox polymerization system which is described, for example, by R. G. K. Bacon in volume 42 of the Transactions of the Faraday Society (1946), page 140 et seq. Reducing agents of this type are exemplified by, but not limited to, oxalic acid, triethylene tetramine, dimethylaniline and pyridine and ferrous salts. When decomposition or rupture of the labile ozonized function is effected by means of reducing agents, 0.01 to 5 parts, preferably 0.1 to 2 parts, by weight of the reducing agent per 100 parts of polymer are suitably employed and grafting is carried out at a temperature comprised between 0 to 180° C., preferably between 30 to 120° C.

The grafting step, wherein the polymer and the monomer are subjected to polymerization; like the treating step with the treating compound, is carried out in any vessel suitable for heating monomers in the presence of polymers as used in conventional processes. Particularly suitable, for example, is an autoclave or a glass polymerization cylinder. It is to be understood that our process is not limited with respect to the type of apparatus in which the several process steps may be carried out and any convenient apparatus appropriate for the purpose may be employed.

The quantity of monomer employed will depend upon the extent of grafting desired. As a general rule the final graft copolymer will contain 0.1 to 1000 parts, preferably 1 to 400 parts, by weight of grafted monomer per 100 parts of backbone polymer. In any case the final graft copolymers should contain substantially more than 5% of the backbone polymer, in order to confer some of the property of the backbone polymer to the grafted product.

The monomer used in the grafting operation is preferably one which if polymerized by itself would produce a polymer having a strong chemically affinity. However, the specific type of monomer used for grafting is not limited, and various monomers may be employed since the invention is primarily concerned with the pre-treatment of a fluorinated polymer with a treating compound of the character described in order to improve the chemical reactivity of the polymer and, in particular, in order to improve its reactivity when subsequently ozonized and grafted.

The monomer which can be grafted to the backbone polymer is suitably, although not exclusively, a vinyl compound, viz, a compound having at least one $CH_2=C<$ group in the molecule, i.e., a methylene group connected by a double bond to another carbon atom. It will be understood that mixtures of monomers as well as the individual monomers may be used to graft a polymer or a mixture of polymers.

Examples of such compounds include the conjugated, open-chain dienes such as the butadiene-1,3 hydrocarbons including butadiene-1,3, isoprene, 2,3-dimethyl butadiene-1,3, and the like, chloroprene, 3-cyano butadiene-1,3, piperylene and the like, trienes such as myrcene, mixtures of conjugated dienes with vinyl and vinylidene compounds such as vinylidene chloride, styrene, p-chlorostyrene, 3,4-dichlorostyrene, p-methoxystyrene, acrylic and alpha-alkyl acrylic acids, their esters, nitriles and amides such as acrylic acid, methacrylic acid, methyl acrylate, octyl acrylate, methyl methacrylate, lauryl methacrylate, acrylonitrile, alpha-chloro acrylonitrile, methacrylonitrile, dimethyl acrylamide and the like, vinyl pyridine, vinyl benzoate, vinyl ketones and vinyl ethers, vinyl carbazole and the like, compounds copolymerizable with the dienes, such as isobutylene, diallyl maleate, 1,4-divinyl benzene and the like, compounds containing both olefinic and acetylenic bonds such as vinylacetylene, vinyl ethynyl carbinol and the like, vinylidene compounds containing only one carbon to carbon double bond such as the vinyl compounds including vinyl chloride, vinylidene, chloride, styrene, p-chlorostyrene, 3,4-dichlorostyrene, p-methoxystyrene, acrylonitrile, methacrylonitrile, alpha-chloro-acrylonitrile, methyl acrylate, ethyl acrylate, methyl methacrylate, butyl ethacrylate, dimethyl acrylamide, vinyl methyl ketone, vinyl methyl ether, vinyl pyridine, vinyl acetate, vinyl propionate, vinyl benzoate and the like, isobutylene, ethylene, and other monoolefinic polymerizable compounds. The above-mentioned vinylidene compounds may be copolymerized with one another or with other unsaturated polymerizable materials such as diethyl maleate, diethyl fumarate, maleic acid, maleic anhydric and the like.

In addition to monomers characterized by the $CH_2=C<$ group, grafting can also be effected with monomers characterized by the $CF_2=C<$ group, such as tetrafluoroethylethylene, and the like, which can be used alone or in a mixture with one or more monomers of this group or of the vinyl group set forth above. Thus, the process is generally applicable to the grafting of all monomers susceptible of being polymerized by a free radical mechanism.

It is to be understood that it is preferable to use polymers and monomers free from any polymerization inhibitors or antioxidants. Frequently, commercial monomers contain polymerization inhibitors and, in this case, it is preferable to remove the inhibitors before using them in the treating step or in the grafting step. This can be done, for instance, by distillation of the monomer or by other known means.

The fluorinated polymer subjected to treatment with the treating agent and subsequent ozonization and grafting is most suitably in a "dry" state and is preferably in the form of a predetermined object, viz. it has been shaped into the form of a film, fiber, tube or the like.

By a "dry" state we mean that the polymer is not dissolved, or diluted, or swelled, or dispersed, or emulsified in a fluid organic or inorganic medium. However, a polymer is in a "dry" state even if it is viscous or rubber-like as a result of its molecular weight or its intrinsic physical properties.

Although the use of the fluorinated polymers in the form of a predetermined object is preferred and is particularly desirable to ensure the maximum realization of the results which can be achieved in accordance with the invention, the fluorinated polymer can also be in particulate form. When the polymer is in the form of a preformed shaped article, it can be ozonized in any apparatus wherein the ozone is continuously brought into contact with the polymer article during the period of treatment.

Thus the polymer is either in the form in which it is to be ultimately utilized, or it is in an intermediate form, e.g. in particulate form, from which a final shaped product can be made by conventional techniques.

Whatever the form of the polymer, the treatment with a treating compound, in accordance with this invention, followed by ozonization and grafting will produce a polymer product having greatly increased adherence to other surfaces in comparison with the original fluorinated polymer, e.g. surfaces of other polymeric objects, metallic surfaces, e.g. steel or aluminium surfaces, and other fluorinated polymer surfaces.

The invention will be more clearly understood from the following specific examples which are given solely by way of illustration and are not intended to limit the invention in any way. In the examples all parts are by weight unless otherwise indicated.

*Example 1*

A film of polytetrafluoroethylene, known in the trade under the name "Teflon," and having a length of 1 meter, a width of 12 cm. and a thickness of 0.2 mm., was exposed for 60 minutes to vapors of styrene at a temperature of 170° C.

After washing with carbontetrachloride to remove any free styrene, followed by drying, spectroscopic examination of the treated polymer showed an absorption of $2.5 \cdot 10^{-6}$ gram moles per square centimeter of the total surface of the film treated on its two faces. It was found that the absorbed material consisted of polystyrene.

The film was then placed for 30 minutes in a current of oxygen flowing at the rate of 450 liters per hr. and having an ozone content of 1.5%. Following ozonization, the film was placed in an enclosure containing only vapors of acrylic acid at a temperature of 100° C. and the film was left in this enclosure for 60 minutes. Following washing with water and drying, the polymer was found to have increased in weight by 6%, this increase being represented by the polyacrylic acid grafted upon the Teflon film.

The thus-treated film was then subdivided into a series of samples. Upon one of these samples, there was placed an adhesive mixture having the following composition:

| | Parts |
|---|---|
| Natural rubber latex (60%) | 25 |
| NH$_4$OH (d.=0.920) | 4.60 |
| Resorcin-formaldehyde solution | 30 |
| Water | 40 |

In the foregoing preparation, the resorcin-formaldehyde solution is prepared by mixing at room temperature the following components:

| | Parts |
|---|---|
| Resorcin | 5 |
| NaOH | 0.07 |
| Formaldehyde (30% aqueous solution) | 11 |
| Water | 85 |

This film sample was then heated at 160° C. for 10 minutes and there was placed upon it a natural rubber film of 2 mm. thickness and having the following composition:

| | Parts |
|---|---|
| Natural rubber | 100 |
| Carbon black, type HAF | 35 |
| Zinc oxide | 5 |
| Sulfur | 3 |
| Accelerator (Santocure) | 1 |

After vulcanization of the assembled films for 30 minutes at 142° C., there was found to be an adherence equal to 5.2 kg./cm.$^2$. When a sample of untreated Teflon film was combined with a rubber film and vulcanized as described above, no adherence between the films could be obtained.

Another sample of the above-described grafted film was coated with the following mixture:

80 parts of polyepoxy resin sold commercially under the name Epikote 828 (Shell, St. Gagain, Paris, France).

47 parts of a polyamide having a low molecular weight and sold in commerce under the name Versamid 125, (Schering, Berlin, Germany).

The thus-coated grafted film sample was then applied upon a grease-free aluminium plate and heated for 2 minutes at 140° C. The resulting adherence between the film and the metal plate was such that the two adhering members could not be pulled apart without tearing the Teflon and the adherence was found to be greater than 6 kg./cm.$^2$.

Example 2

A strip of polytrifluoromonochloroethylene having a length of 20 cm., a width of 10 cm. and a thickness of 1 cm. was heated for 3 hrs. at 160° C. in an environment consisting of styrene vapors.

After washing with carbon tetrachloride and drying, the amount of styrene fixed was of $0.9 \cdot 10^{-5}$ gram mole per square centimeter of the total strip.

Then the strip was coated with fluorinated paraffin to prevent attack by ozone. The strip was then ozonized under the same conditions described in Example 1 and then heated in the presence of methacrylic acid vapors at 80° C. for 2 hrs. After washing with water and drying, the strip was coated with the mixture of Epilote and Versamid described in Example 1. The thus-coated strip was then applied to a strip of 18/8 stainless steel having a thickness of .5 mm. and the assembly was heated for 1 hr. at 100° C. The resulting adherence between the two materials was found to be 45 kg./cm.$^2$ measured perpendicularly to the plane of bonding.

Example 3

A copper wire of .7 mm. thickness was covered with a continuous coating of 1 mm. thickness of a copolymer of tetrafluoroethylene and hexafluoropropylene known in commerce uder the name Teflon 100 (E. I. du Pont de Nemours). This wire was treated with styrene following the procedure described in Example 1.

The amount of Styrene fixed was of $6.5 \cdot 10^{-6}$ gram moles per square centimeter of the surface of the wire.

Following the procedure described in Example 1, the treated wire was ozonized and grafted with acrylic acid. After grafting, the thus-produced coated wire was freely marked by links commonly employed for the marking of electric cables.

In particular, when this coated wire was treated for 10 minutes at 90° C. with a 1/1000 solution of Blue Astrazon, it acquired a very intense coloration. In contrast, a coated wire which had not been treated with styrene, ozonized, and grafted, remained completely colorless when treated with this dye. Another sample which had been ozonized and grafted but not first treated with styrene absorbed some of the dye but gave only a very light blue coloration.

Example 4

A film of polytetrafluoroethylene of the type described in Example 1 was treated with styrene and was ozonized under the conditions described in that example.

The thus-treated film was then placed in a 10% aqueous solution of itaconic acid in the proportions such as the ratio between the acid and the fluorinated polymer was 1:1.

This mixture was then heated at atmospheric pressure at 128° C. for 4 hrs. and after washing with water and drying, the polymer was found to have increased in weight by 2.7%.

By treating the thus obtained film in the presence of a film of natural rubber as described in Example 1, there was obtained an adherence equal to 3.5 kg./cm.$^2$ and when the film was treated in the presence of a sheet of aluminium as described in Example 1, a comparable adherence was obtained.

Example 5

A strip of polytetrafluoroethylene having a length of 20 cm., a width of 10 cm. and a thickness of 1 cm. was maintained for 75 minutes in the presence of vapors of divinylbenzene at 175° C. After washing with boiling carbon tetrachloride, the strip was dried and showed a weight increase of 0.3%. This treated strip was ozonized for 1 hr. under the conditions described in Example 1. The ozonized strip was then placed, in the absence of oxygen, in the presence of vapors of acrylic acid for 2 hrs. at 100° C. After washing with water and drying, the strip was coated with Epikote-Versamid mixture described in Example 1 and maintained for 24 hrs. at room temperature in contact with a strip of bronze of the same dimensions under a pressure of 1 kg./cm.$^2$. The adherence between the two strips, measured perpendicularly to the plane of adherence, was found to be 62 kg./cm.$^2$.

It will be apparent that various changes and modifications may be made in the embodiments herein described without departing from the scope of the invention as defined in the appended claims. It is intended, therefore, that all matter contained in the foregoing description shall be interpreted as illustrative only and not as limitative of the invention.

We claim:

1. A process of grafting a fluorinated polymer formed from ethylenically-unsaturated monomer and having a molecular weight greater than 2,000 which comprises heating said polymer prior to ozonization in the presence of an organic compound containing at least one ethylenic double bond and at least one ring selected from the group consisting of benzene, pyridine and thiophene, thereafter treating the resultant product with ozone, and graft copolymerizing the resultant ozonized polymer with a polymerizable ethylenically-unsaturated monomer.

2. A process as defined in claim 1 wherein said polymer is in the form of a predetermined shaped object.

3. A process of grafting a fluorinated polymer formed from ethylenically-unsaturated monomer and having a molecular weight greater than 2,000 which comprises heating said polymer prior to ozonization in the presence of styrene, thereafter treating the resultant product with ozone, and graft copolymerizing the resultant ozonized polymer with a polymerizable ethylenically-unsaturated monomer.

4. A process of grafting a fluorinated polymer formed from ethylenically-unsaturated monomer and having a molecular weight greater than 2,000 which comprises heating said polymer prior to ozonization in the presence of divinyl benzene, thereafter treating the resultant product with ozone and graft copolymerizing the resultant ozonized polymer with a polymerizable ethylenically-unsaturated monomer.

5. A process as defined in claim 1 wherein said polymer is heated in the presence of said organic compound at a temperature of the order of 80° C. to 250° C.

6. A process as defined in claim 1 wherein said fluorinated polymer is selected from the group which consists of homopolymers and copolymers of fluorinated unsaturated monomers which are selected from the group which consists of tetrafluoroethylene, trifluoromonochloroethylene, and hexafluoropropylene.

7. A process of grafting a fluorinated polymer having a molecular weight greater than 2,000 selected from the group which consists of homopolymers and copolymers of fluorinated olefins selected from the group consisting of tetrafluoroethylene, trifluoromonochloroethylene, and hexafluoropropylene which comprises heating said polymer prior to ozonization at a temperature of the order of 80° to 250° C. in the presence of an organic compound containing at least one ethylenic double bond and at least one ring selected from the group consisting of benzene, pyridine, and thiophene, thereafter treating the resultant product with ozone, and graft copolymerizing the resultant ozonized polymer with a polymerizable ethylenically-unsaturated monomer.

8. A process of grafting a fluorinated polymer having a molecular weight greater than 2,000 selected from the group which consists of homopolymers and copolymers of fluorinated olefins selected from the group consisting of tetrafluoroethylene, trifluoromonochloroethylene, and hexafluoropropylene which comprises heating said polymer prior to ozonization in the presence of styrene, thereafter treating the resultant product with ozone, and graft copolymerizing the resultant ozonized polymer with a polymerizable ethylenically-unsaturated monomer.

9. A process of grafting a fluorinated polymer having a molecular weight greater than 2,000 selected from the group which consists of homopolymers and copolymers of fluorinated unsaturated monomers which comprises heating said polymer prior to ozonization at a temperature of the order of 80° to 250° C. in the presence of styrene, thereafter treating the resultant product with ozone, and graft copolymerizing the resultant ozonized polymer with a polymerizable ethylenically-unsaturated monomer.

10. A process of grafting a fluorinated polymer having a molecular weight greater than 2,000 selected from the group which consists of homopolymers and copolymers of fluorinated unsaturated monomers which comprises heating said polymer prior to ozonization at a temperature of the order of 80° to 250° C. in the presence of divinyl benzene, thereafter treating the resultant product with ozone, and graft copolymerizing the resultant ozonized polymer with a polymerizable ethylenically-unsaturated monomer.

11. A graft copolymer produced by heating a fluorinated polymer formed from ethylenically-unsaturated monomer and having a molecular weight of at least 2,000 in the presence of an organic compound containing at least one ethylenic double bond and at least one ring selected from the group consisting of benzene, pyridine, and thiophene prior to ozonization, thereafter treating the resultant product with ozone, and graft polymerizing the resultant ozonized polymer with a polymerizable ethylenically-unsaturated monomer.

12. A graft copolymer produced by heating a fluorinated polymer formed from ethylenically-unsaturated monomer and having a molecular weight of at least 2,000 in the presence of styrene prior to ozonization, thereafter treating the resultant product with ozone, and graft copolymerizing the resultant ozonized polymer with a polymerizable ethylenically-unsaturated monomer.

References Cited by the Examiner

UNITED STATES PATENTS

| 2,789,063 | 4/1957 | Purvis et al. | 161—189 |
| 2,867,608 | 1/1959 | Landrum et al. | 260—45.5 |
| 2,941,912 | 6/1960 | Cox et al. | 161—188 |

FOREIGN PATENTS

| 562,661 | 5/1958 | Belgium. |
| 883,791 | 12/1961 | Great Britain. |

MURRAY TILLMAN, *Primary Examiner.*

JAMES A. SEIDLECK, SAMUEL H. BLECH,
*Examiners.*